United States Patent [19]

Praeg

[11] 4,358,808
[45] Nov. 9, 1982

[54] HIGH ENERGY OVERCURRENT PROTECTIVE DEVICE

[75] Inventor: Walter F. Praeg, Palos Park, Ill.

[73] Assignee: The United States of America as represented by the United States Department of Energy, Washington, D.C.

[21] Appl. No.: 264,243

[22] Filed: May 18, 1981

[51] Int. Cl.³ .............................................. H02H 9/02
[52] U.S. Cl. ....................................... 361/11; 361/43; 361/58
[58] Field of Search .................. 361/10, 11, 42, 43, 361/58

[56] References Cited

U.S. PATENT DOCUMENTS

| | | | |
|---|---|---|---|
| 3,453,494 | 7/1969 | Allen | 361/43 |
| 3,968,408 | 7/1976 | Allen | 361/58 |
| 4,054,933 | 10/1977 | Praeg | 361/57 |

OTHER PUBLICATIONS

"Present and Future Technology of High Voltage Systems for Neutral Beam Injectors"—Baker et al.; Lawrence Berkely Lab. Pub. LBL-7261, 1/27/78.
"Overcurrent Protection for the TFTR Neutral Beam Sources During Spark Down"—Praeg; IEEE Pub. No. 79CH1441-5 NPS, 11/79.

*Primary Examiner*—Harry E. Moose, Jr.
*Attorney, Agent, or Firm*—Bruce R. Mansfield; Paul A. Gottlieb; Richard G. Besha

[57] ABSTRACT

Electrical loads connected to capacitance elements in high voltage direct current systems are protected from damage by capacitance discharge overcurrents by connecting between the capacitance element and the load, a longitudinal inductor comprising a bifilar winding wound about a magnetic core, which forms an incomplete magnetic circuit. A diode is connected across a portion of the bifilar winding which conducts a unidirectional current only. Energy discharged from the capacitance element is stored in the inductor and then dissipated in an L-R circuit including the diode and the coil winding. Multiple high voltage circuits having capacitance elements may be connected to loads through bifilar windings all wound about the aforementioned magnetic core.

7 Claims, 7 Drawing Figures

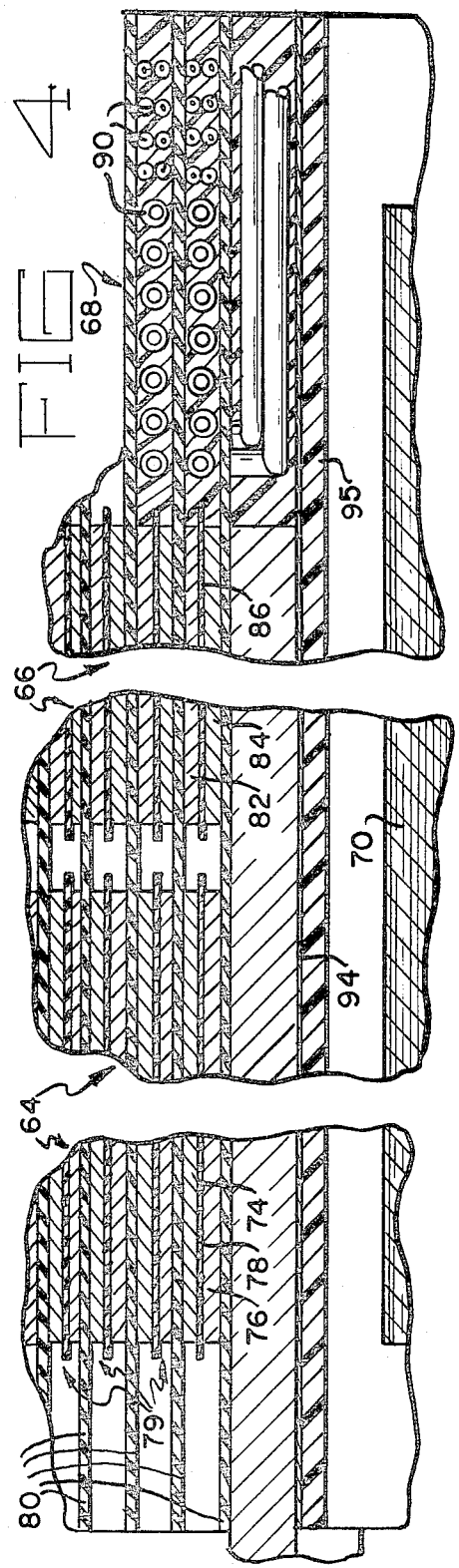
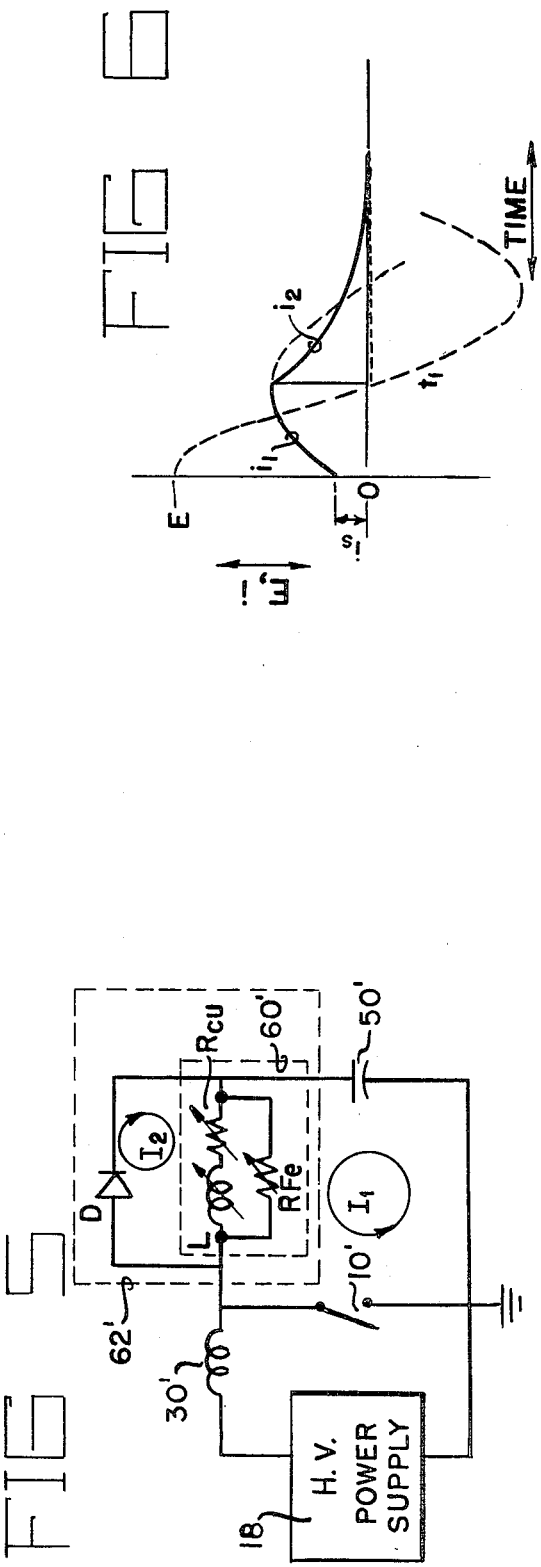

HIGH ENERGY OVERCURRENT PROTECTIVE DEVICE

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

The invention relates to the protection of direct current electrical loads from damaging overcurrents. More particularly, this invention relates to protection against fast transients like those caused by discharge of system high voltage capacitance elements.

Electrical loads that are connected to high-voltage d-c power supplies are frequently subject to a risk of destruction by delivery of some of the power from the supply to portions of the load in excessive quantities as a result of a fault. This is especially true of high-voltage accelerating structures connected to high-voltage power supplies, although almost any load that is connected to a d-c power supply is capable of being damaged at least locally, by fault currents. However, the threat of electrical breakdown is greatest in those electrical loads that are connected to power supplies of relatively high voltage, of the order of tens of kilovolts. One arrangement to protect against transient overloads was described in U.S. Pat. No. 4,054,933, issued to the inventor of the present invention on Oct. 18, 1977. In that patent, a saturated time delay transformer connected in series with a load detected a load fault and limited the fault current to a safe level for a period long enough to correct the fault or else disconnect the power supply from the load.

Frequently, a large fault energy is stored in the system leakage capacitance to ground. One arrangement for limiting system capacitance discharge currents includes an arc snubber device in which single turns of several conductor pairs (each comprising separate discharge paths) are passed through a magnetic toroidal core of 50/50 NiFe material, such as Deltamax. This material is much more expensive than common silicon steel magnetic materials and presents unique problems as will be explained below. The single turns which pass through the interior of the toroidal core are arranged as bifilar windings, i.e., windings comprising complete sets of bipolar conductors which form a complete direct current circuit when connected between a load and its source. Such snubber devices interpose high resistance (caused by eddy current losses) between the capacitance discharge source and the load. Deltamax material is usually used for the core since it is especially effective for providing eddy current resistance. Such arrangements require a magnetic reset winding or circuit which returns the Deltamax core after cessation of the magnetizing fault current, to a point on the core's magnetization or hysteresis loop operating curve where the residual field in the core is very small. Such reset circuits have iron losses which contribute to the fault current through the load.

The Deltamax toroidal cores provide an exponential RC discharge of the system leakage capacitance. Inherent in such circuits, due to their iron losses, is an undesirable initial current step which allows a large $I^2t$ discharge through the system to be protected. The energy peak associated with a large initial $I^2t$ value is very destructive since it causes metal vaporization on occasion. At the present time, snubbers are limited by a maximum operating voltage, about 200 KV. Despite design theory, snubbers are unable to limit fault current peaks in systems operating above about 200 KV according to W. R. Baker and D. B. Hopkins in their paper entitled, "Present and Future Technology of High Voltage Systems for Neutral Beam Injectors," dated Jan. 27, 1978. Further, snubber arrangements are very expensive and heavy, so as to be unfeasible for many retrofit improvements for existing high voltage systems. The cost and size of the toroidal snubber arrangements can be more readily understood with regard to the following relationship which describes the initial transient fault value, or current step $i_s$, of such a snubber as:

$$i_s = kl(E/WNn^3)^{\frac{1}{2}}$$

where k is a constant related to the physical property of the core material (3.18 for 50/50 NiFe; 10.5 for Silectron steel), l is the mean circumferential length of flux path in the toroidal core, W and N are the width and total number of core laminations, respectively, n is the number of turns of the coil, and E is the step voltage applied to the snubber coil. Systems having a high voltage (several hundred kilovolts) and high current (several thousand amperes) load can accommodate only a single turn (n=1). The very large cross-sectional area of the coil conductors needed for large current handling capability effectively prohibits multiple turn coils which must be disposed in the interior of a toroidal core. Also, the distance between conductors of adjacent turns of a coil must be large to accommodate the high voltage levels. Therefore, in order to put more turns through the interior of a high energy toroidal core, the inner diameter of the core must be increased, causing a proportional increase in the length l of the flux path, and in the step current, according to the above relationship. Because of its magnetic properties, Deltamax material is usually used, as opposed to increasing the number of turns n, which is not possible in the high energy applications as noted above. The magnetic properties of the Deltamax material, particularly its magnetic permeability, changes with applied mechanical stress. Therefore elaborate precautions must be taken to protect the Deltamax material from stress, e.g., each core section of the material is encased in a nylon sheath filled with rubber. Further, after winding, the core must be annealed in an inert atmosphere, to eliminate winding stresses and to achieve the desired magnetic properties.

In operation, such snubber devices, while lowering the amount of $I^2t$ consumed during fault conditions, allowed an initial step or fault current through the system they protected. This steeply rising current wave presents dangerous $I^2t$ levels to load portions of the system. The snubber causes the initial step current to decay exponentially (RC discharge) through the equipment to be protected. This current decay pulse may damage the equipment to be protected.

It is therefore an object of the present invention to provide a device for limiting capacitive discharge current, which has a reduced size and weight and which is comprised of a fewer number of inexpensive parts.

A further object of the present invention is to provide a current limiting device which reduces initial step current increases and which decreases the initial rate of rise of the fault current, thereby reducing the overall let-through $I^2t$ value fed to the load.

Another object of the present invention is to provide an oscillatory discharge circuit which limits fault current discharged from the circuit leakage capacitance through the load, to a slowly rising L-C discharge which has a small initial current value, and has a peak current which can be controlled by a practically achievable appropriate inductance.

Another object of the present invention is to provide a protection device having a magnetic core that is constructed of inexpensive material and does not require magnetic biasing or reset circuits.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These and other objects of the present invention are provided in an overcurrent protective coil device and circuit for systems having a plurality of conductors connected between a low voltage direct current circuits and system capacitance elements operated at a much higher voltage than those circuits. The coil comprises conductors which are arranged in a bifilar form, such that they complete direct current circuits when connected between a source and a load, with each circuit containing bipolar currents flowing between the source and the load and then returning from the load to the source. The conductors of each such circuit extending between source and load are kept as a grouped set throughout their length. Examples of such grouped or bifilar sets are found in coaxial cable, twisted wire pair, ribbon cable, parallel strip lines and the like constructions where the conductors are maintained in a defined close spaced-apart configuration throughout their length. Each circuit extending between the high voltage capacitance elements and the load is wound in the same direction and with equal turns, about a common magnetic core, such that the several layers of each winding of each circuit have the same thickness or build-up. The magnetic core forms an incomplete magnetic circuit and preferably takes the form of an elongated cylinder. The remainder of the magnetic circuit is comprised of a low magnetic permeability path, preferably air. A conductive eddy current shield surrounds the magnetic core to confine magnetic flux therein. The shield preferably is provided by the aforementioned windings which comprise copper tape-wound coils in which sets of copper tapes are wound together as a single unit in bifilar fashion.

The aforementioned windings are connected in series with the system to be protected so as to form an oscillatory circuit with the system capacitance. The frequency of oscillation is chosen to limit the discharge current to safe levels. Under normal load conditions, no magnetic field is created by the bifilar windings, but since each conductor of each bifilar winding carries the overcurrent associated with its capacitance discharge circuit, there is no flux cancellation during fault conditions, and the magnetic core is excited. A diode is connected across one-half of one of the bifilar windings, i.e., across one or more conductors of a bifilar set that comprise a unidirectional current path for one system circuit. The initial step current during fault conditions is limited by the coil and core design, and the oscillatory fault current is superimposed on this step current. After a quarter cycle of current discharge, the capacitor voltage is zero and all the discharge energy is stored in the coil inductance. The voltage polarity of the inductor then reverses, causing conduction in the aforementioned diode whose forward voltage clamps the voltage across the winding during discharge. The energy stored in the inductance of the coil is then discharged into the coil resistance, operating as an L-R circuit. The capacitor energy to be dissipated by the arrangement may be carried by the circuit whose winding is connected to the diode, or it may be carried by another circuit that includes a winding wound about a magnetic core which is common to the winding connected to the diode.

DESCRIPTION OF THE DRAWING

FIG. 4 is a partial elevational view showing the coil of FIG. 2 in greater detail.

FIG. 5 is a schematic circuit corresponding to the arrangement of FIG. 1, but showing the overcurrent protection device of the present invention in greater detail.

FIG. 6 is a graph indicating operation of the protective device of the present invention during fault conditions.

DETAILED DESCRIPTION OF THE PREFERRED EMBODIMENT

Figure 1:
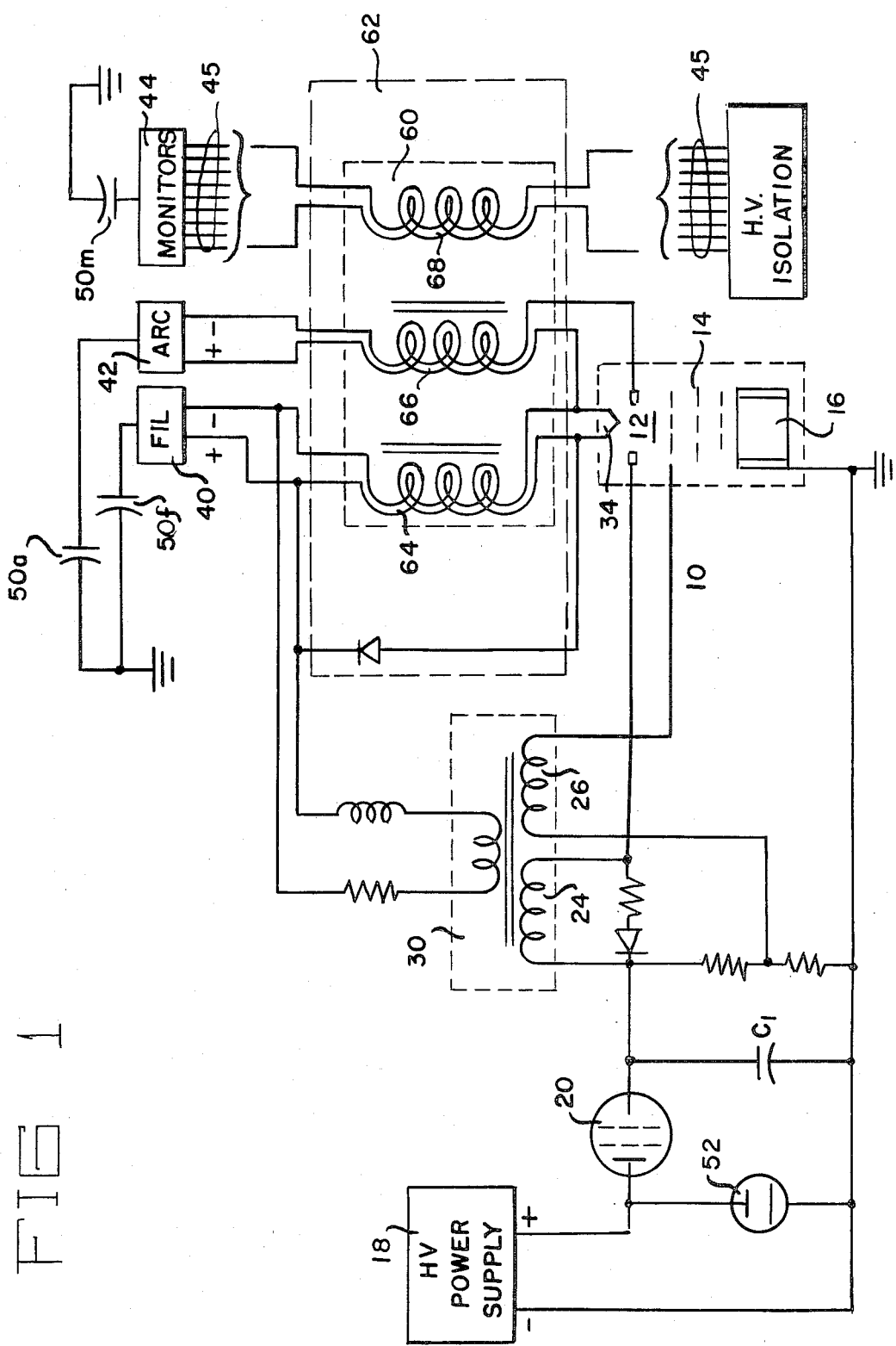
FIG. 1 is a circuit diagram of a neutral beam source protected by the present invention.

Referring now to FIG. 1, numeral 10 is applied to a load or neutral beam source (NBS) which comprises gap 12 and a grid system 14. Hydrogen ions are introduced into gap 12 and accelerated by grid 14, passing through beam neutralizer 16 which electrically neutralizes the accelerated beam. High voltage power supply 18 is connected to NBS 10 through switch tube 20 and windings 24, 26 of saturated time delay transformer (STDT) 30. Operation of STDT 30 is described in U.S. Pat. No. 4,054,933 issued to Walter F. Praeg, the inventor of the present invention, on Oct. 18, 1977, and will not be fully set out here. Filament 34 and gap 12 of NBS 10 are driven by low voltage d-c filament and arc power supplies 40, 42 respectively which in turn are energized through a high voltage isolation transformer not shown in the figure. Also shown in FIG. 1 is a high voltage d-c circuit 44 to which lower voltage monitor and control circuits are connected through cables 45. In the system described above, power supply 18 supplies 65 amperes at a voltage of 150 kv. Gap 12 is operated at 120 kv to ground as are the filament arc and monitor power supplies 40, 42 respectively. Grid 14 is operated at 90 kv. The designations 50$f$, 50$a$, and 50$m$ are applied to capacitance elements which represent a leakage capacitance of approximately 2 nanofarads between the filament, arc and monitor circuits respectively, and ground. The malfunction to be protected against by the present invention arises in a flashover or insulation breakdown within NBS 10, causing an effective grounding of filament 34. A crowbar circuit 52, switch tube 20, STDT 30, and other associated circuitry not shown in the Figures, limit the fault current of power supply 18 and capacitor $C_1$. However, considerable energy (14 Joules) is stored in the capacitance of elements 50f, 50a and 50m. The arrangement of the present invention effectively limits the fault current contributed by these capacitance elements. D-C power supply circuits 40, 42 and auxiliary d-c circuits 44 are connected to their respective loads through longitudinal inductor or coil 60 and a circuit 62 of the present invention. It will be noted that the power supplies and auxiliary circuits are connected directly to their respective loads with at least one pair of conductors representing positive and negative polarity circuit elements, without relying on a "chassis" ground or the like return path expedient. In FIG. 1, only three high voltage elements (power supplies 40, 42, and circuit 44) are connected to ground or much lower voltage circuit components through leakage capacitances. Accordingly, the protective coil 60 of the present invention has only three windings 64, 66, and 68, one for each high voltage circuit. As indicated schematically in FIG. 1, windings 64, 66, and 68 are bifilar, that is each winding is comprised of conductor sets that form a complete d-c circuit when connected between a source and a load. Such bifilar construction is observed in coaxial cable, twisted pair, ribbon cable parallel strip line, or the like constructions where multiple conductors are joined together throughout their length in fixed spaced apart relationships. Thus, under normal load conditions, no net magnetic flux is created within windings 64, 66 or 68, owing to the bipolar current flow in each winding set which produces mutually canceling magnetizing currents. However, when the load connected to high voltage power supplies 40, 42, or circuit 44 breaks down or is otherwise shorted to ground, the energy in the respective capacitive elements 50a, 50f, and 50m is discharged through windings 64, 66 and 68, respectively. With regard to each high voltage circuit of a power supply, a winding, and a load, the discharge is simultaneously carried in all conductors of a given winding. In this event, the currents do not cancel, and magnetizing flux is generated in each winding carrying a discharge. In practice, such discharges are extremely short (a few microseconds) and even though not of long duration, their $I^2t$ characteristics are sufficient to cause destruction of their connected loads if $I^2t$ is not limited.

Figure 2:
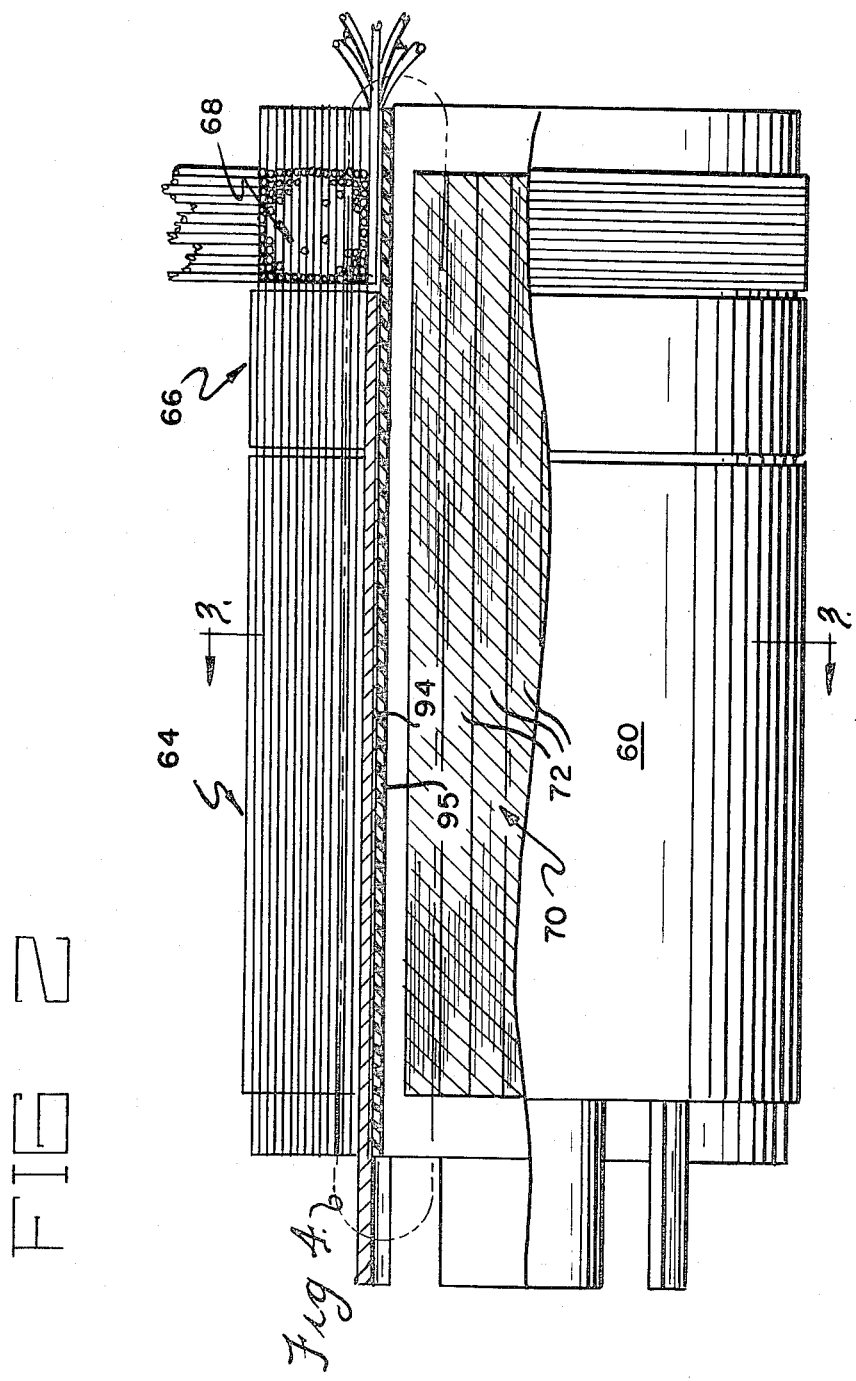
FIG. 2 is a elevational view of a coil constructed according to the invention.
Figure 3:
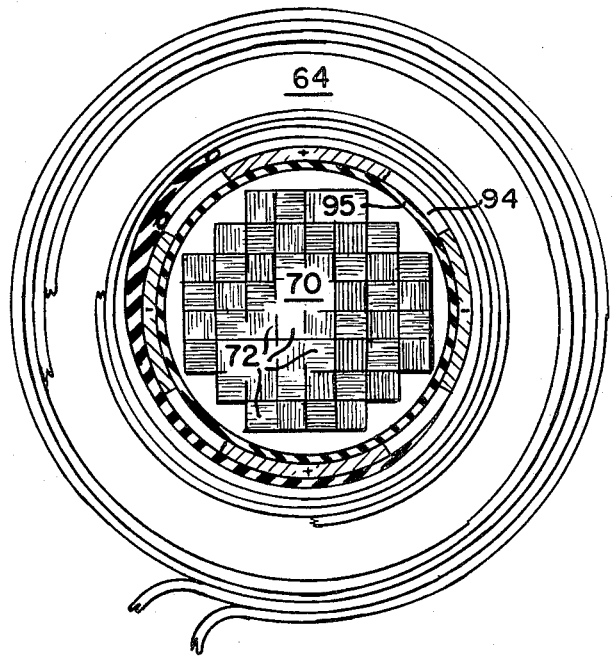
FIG. 3 is a cross-sectional elevational view taken along the lines 3—3 of FIG. 2.

Referring now to FIG. 2, a coil 60 constructed according to the invention is shown comprising windings 64, 66, and 68. As can be seen in the cross-sectional view of FIG. 3, the coils are wound about a laminated silicon steel core 70 formed of cylindrical sections 72, as is known in the art. The windings of FIG. 2 will now be described with reference to FIG. 4 in which a single layer or turn of each winding 64, 66, 68 is shown in greater detail. Windings 64, 66 carry heavy current loads and are comprised of bifilar wound sets of copper sheets or tapes. Winding 64 is made of copper sheets or tapes 74, 76 which are separated by the inter-turn insulation of insulator tape 78. Tapes 74, 76 form supply and return, positive and negative or the like-designated bipolar paths which complete the d-c circuit of d-c power supply 40, and filament 34. For the purpose of the coil winding operation used to form coil 60, tapes 74, 76 and 78 may be considered as an integral unit 79 which is continuously wrapped or turned about core 70 to form winding 64. The layers or turns 79 of winding 64 are insulated from each other by an insulator barrier or turn-to-turn insulation 80 which provides turn-to-turn insulation between adjacent layers of conductor sets 74, 76, and 78. Winding 66 is formed in a similar fashion, using copper tapes 82, 84 separated by inter-turn insulation 86. Each layer of winding 64 is located laterally adjacent each layer of winding 66 to reduce voltage stress between the layers of those windings. Similarly, coil 68 which is formed of a variety of coaxial cables 90, each turn thereof being aligned laterally adjacent the layers of coil 66. Each winding wound about common core 70 contains an equal number of turns. To insure uniform alignment of adjacent coils, turn-to-turn insulation barriers 80 are made common to each layer of each winding wound on coil 60. Further, barrier 80 extends axially outwardly beyond end coils 64, 68, to increase the creepage path between adjacent layers of an end coil.

Figure 7:
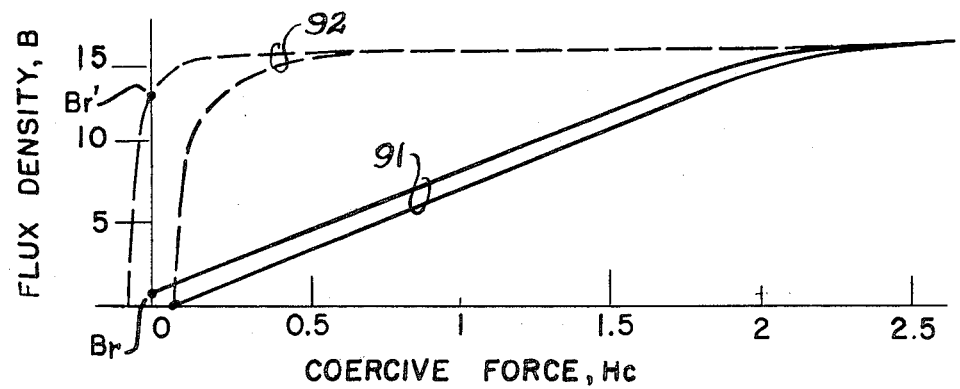
FIG. 7 is a d-c hysteresis loop diagram for the magnetic core of FIGS. 2 and 3.

Core 70 of coil 60 is a straight core forming an incomplete magnetic path for flux transmitted therethrough. The remainder of the magnetic circuit is of low reluctance being located in a large volume of air surrounding coil 60. With reference to FIG. 7, it can be seen that this arrangement eliminates the need for a magnetic reset circuit. Although core 70 is shown as a "straight" core, any magnetic circuit having a large portion thereof of low magnetic permeability will perform satisfactorily. These cores have a d-c hysteresis curve 91 that crosses the axis of induced flux density B, at a very low value, $B_r$, as opposed to cores of closed magnetic field arrangements that have a much higher value of $B_r$ ($B_r'$ on curve 92) for a zero magnetizing force value. Surrounding the magnetic core 70 is an eddy current shield 94 formed of aluminum, copper or the like electrical conductor wrapped around the fiberglass core 95 of the coil. The shield is constructed such that it does not present a shorted turn to the magnetic field of the core. Shield 94 shapes the magnetic field by containing it in core 70, in that any stray flux attempting to penetrate shield 94 will set up energetically unfavorable eddy currents therein. Since windings 64, 66 are comprised of copper sheets or tapes, the portion of shield 94 adjacent thereto may be omitted if desired, with the coils being wound directly on fiberglass core 95.

Referring now to FIG. 5, at initial fault current conditions, capacitor 50' is charged to the power supply voltage E. The initial discharge of capacitance 50' is through resistance RFe, the resistance equivalent to eddy current losses of core 70, causing an initial current step $i_s$. Superimposed on the current step is an oscillatory current $i_o$ which has an initial current value of zero, displaced 90° from the voltage wave. During initial fault conditions, loop current $I_1$ is the step current $i_s$ and afterwards $I_1$ is the rising oscillatory current $i_o$ which flows through capacitance 50', coil components L, and winding resistance RCu, and load 10'. When $i_o$ reaches a maximum, the voltage across capacitance 50' is zero and all the energy is stored in inductance L, whereupon the polarity across inductance L reverses, biasing diode D in a forward direction. When diode D is conducting at this current peak, loop current $I_2$ begins to flow, discharging the fault energy through RCu, the copper losses in coil arrangement 60, 60'. This discharge is an exponential decay of an L-R circuit comprising coil components L, RCu and diode D. The current flowing between time 0 and $t_1$ is conducted through the load. After an initial time period $t_1$, fault energy stored in L is dissipated in circuit elements outside NBS 10, 10'. The dotted portion 102 of current wave $i_1$, cut off by the L-R circuit of L, D and Cu, is shown to indicate the oscillatory nature of circuit 62, 62'.

The protective coil and circuit according to the invention was designed for the Tokamak Fusion Test Reactor (TFTR) facility operated by the Princeton Plasma Physics Lab located in Princeton, N.J. Twelve overcurrent protective arrangements were required, one for each neutral beam source (NBS) of the reactor facility. Each NBS unit had a 65 ampere 120 KV d-c power source; a 6000 ampere, 120 KV filament circuit; a 3000 ampere, 120 KV arc circuit and several monitor and control circuits, each operated at 120 KV. The system high voltage level was 120 KV D.C. and the leakage capacitance values 50a, 50f and 50m combined, were 2 nanofarads storing an energy of 16 Joules. The core of the coil was comprised of 50 bars of 2 mil thick Silectron steel having dimensions 1 inch×1 inch×29 inches. The length of the core was kept to a minimum to keep the step current of the initial fault conditions to a minimum. Twenty turns of bifilar copper tape assemblies were wound about the magnetic core. The coil had an inductance of 1.1 mH, a resistance equivalent eddy current loss RFe of 2000 ohms.

Owing to the eddy current shields, the design flux density in the center of the core was approximately 2000 gauss. The leakage fields of the core, which last only for a few microseconds would easily be attenuated by a factor of one hundred with a thin metal shield, if the coil was comprised of wire turns, rather than the preferred sheet or tape turns. The value of inductance L can be chosen to obtain a desired maximum current according to the following equation:

$$i_{max} \leq i_{step} + E(C/L)^{\frac{1}{2}}$$

where $i_{step}$ is the step current of the equation set forth above, E is the system voltage level to which the leakage capacitance is charged, C is the value of system leakage capacitance, and L is the inductance of the coil. These values are fixed for a given system, and L the inductance of the coil is chosen to obtain the desired $i_{max}$. The value of L also determines the time value of the first $\frac{1}{4}$ cycle of discharge at which the discharge current reaches its maximum value, $i_{max}$.

The embodiments of the invention in which an exclusive property or privilege is claimed are defined as follows:

1. A device for protecting a direct current system against discharge of a capacitance element in which energy is stored, the system having a load electrically connected to the capacitance element, said device including an inductor having an inductance, comprising:
   a magnetic circuit including a first portion of ferromagnetic material having a first magnetic permeability and a second portion having a second magnetic permeability less than the first magnetic permeability of said first portion;
   at least one coil disposed about said first portion of said magnetic circuit electrically connected between said capacitance and said load such that said magnetic circuit is not magnetically excited during first operating conditions of said direct current system;
   said coil further connected between said capacitance and said load for conducting a discharge of said capacitance element during second operating conditions of said direct current system that magnetically excites said magnetic circuit setting up a magnetic field in said first portion of said magnetic circuit;
   an eddy current shield of electrically conductive material disposed about said first portion of said magnetic circuit, for containing a magnetic field in said first portion of said magnetic circuit;
   said inductor and said capacitance element comprising an oscillatory circuit L-C circuit energized by the discharge of said capacitance element;
   said device further including a diode connected across a first portion of said one coil which conducts current of a first polarity only, said diode conducting a first portion of the energy of a discharge of said capacitance element which is dissipated in said inductor, whereby the first portion of the energy of a discharge of said capacitance element is diverted from the load during second operating conditions of said direct current system.

2. The arrangement of claim 1 wherein said one coil comprises at least two copper tapes wound about said first portion of said magnetic circuit to form a bifilar winding, said copper tapes comprising said eddy current shield.

3. The arrangement of claim 2 wherein said first portion of said magnetic circuit comprises a magnetic core having a cylindrical arrangement of laminated sections.

4. The arrangement of claim 3 further comprising a second capacitance element connected to the load through a second coil wound about said first portion of said magnetic core, said one and said second coils comprising equal number of turns of first and second conductor sets, having an equal build-up thickness.

5. The arrangement of claim 4 wherein said load comprises a neutral beam source and said capacitance elements comprise the leakage capacitances of a first and a second high voltage power supply connected to said neutral beam source through said one and said second coils of said conductor.

6. The arrangement of claim 5 further including a single insulating tape separating individual turns of said one and said second coils from adjacent turns of said same coils, respectively.

7. The arrangement of claim 3 wherein:
   said inductor comprises a series connection of the inductance of said inductor and a resistance equivalent of copper losses of said one coil;
   said inductor further comprises a resistance equivalent of eddy current iron losses of said inductor connected in parallel with said series connection;
   said diode is also connected in parallel with said series connection; and
   said inductance of said inductor stores the first portion of the energy of the discharge of the capacitance element so as to bias said diode into conducting the first portion of the energy of the discharge of the capacitance element through the resistance equivalent of copper losses of said one coil so as to dissipate therein the first portion of the energy of the discharge stored in the capacitance element.

* * * * *